(12) United States Patent
Jubran et al.

(10) Patent No.: US 11,340,870 B2
(45) Date of Patent: *May 24, 2022

(54) SOFTWARE RELEASE WORKFLOW MANAGEMENT

(71) Applicant: Microsoft Technology Licensing, LLC, Redmond, WA (US)

(72) Inventors: Marwan E. Jubran, Redmond, WA (US); Aleksandr Gershaft, Redmond, WA (US); Maksim Libenson, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/882,426

(22) Filed: Jan. 29, 2018

(65) Prior Publication Data

US 2018/0157466 A1 Jun. 7, 2018

Related U.S. Application Data

(63) Continuation of application No. 13/828,842, filed on Mar. 14, 2013, now Pat. No. 9,916,133.

(51) Int. Cl.
*G06F 8/00* (2018.01)
*G06F 8/71* (2018.01)
*G06F 8/77* (2018.01)

(52) U.S. Cl.
CPC .............. *G06F 8/00* (2013.01); *G06F 8/71* (2013.01); *G06F 8/77* (2013.01)

(58) Field of Classification Search
CPC .............................. G06F 8/00; G06F 8/71–77

USPC .................................................. 717/101–121
See application file for complete search history.

(56) References Cited

U.S. PATENT DOCUMENTS

| 5,796,633 | A | 8/1998 | Burgess et al. |
| 6,145,089 | A | 11/2000 | Le et al. |
| 6,907,546 | B1 | 6/2005 | Haswell et al. |
| 7,360,210 | B1 | 4/2008 | Vacanti et al. |

(Continued)

FOREIGN PATENT DOCUMENTS

| CN | 1900906 A | 1/2007 |
| CN | 101361053 A | 2/2009 |
| EP | 1881447 | 1/2008 |

OTHER PUBLICATIONS

Howden, "Applicability of Software Validation Techniques to Scientific Programs", ACM, pp. 307-320 (Year: 1980).*

(Continued)

*Primary Examiner* — Anil Khatri
(74) *Attorney, Agent, or Firm* — Chin IP, PLLC

(57) ABSTRACT

A computer-implemented method for managing a release of a software product includes obtaining a request for the release, the request including workflow action parameter data to define a release pipeline involving a plurality of software engineering systems configured to process data indicative of the software product, and executing, with a processor, a workflow to implement the release pipeline in accordance with the workflow action parameter data. Executing the workflow includes sending a series of instructions to the plurality of software engineering systems. A successive instruction in the series of instructions is sent based on whether a gating rule for the release is met.

19 Claims, 4 Drawing Sheets

(56) References Cited

U.S. PATENT DOCUMENTS

| | | | |
|---|---|---|---|
| 7,509,655 | B2 | 3/2009 | Willis et al. |
| 7,958,494 | B2* | 6/2011 | Chaar ........................ G06F 8/10 |
| | | | 717/121 |
| 8,078,487 | B2 | 12/2011 | Li et al. |
| 8,296,719 | B2* | 10/2012 | Chaar .................... G06Q 10/00 |
| | | | 717/103 |
| 8,341,591 | B1* | 12/2012 | Knauth ................ G06Q 10/101 |
| | | | 717/102 |
| 8,677,315 | B1 | 3/2014 | Anderson et al. |
| 8,682,701 | B1* | 3/2014 | Knauth .................. G06Q 10/06 |
| | | | 705/7.11 |
| 9,026,577 | B1* | 5/2015 | Johnston .............. G06Q 10/103 |
| | | | 709/202 |
| 9,565,246 | B1* | 2/2017 | Tsypliaev ................ H04L 67/10 |
| 9,910,654 | B1* | 3/2018 | Brigham, II .............. G06F 8/61 |
| 9,928,379 | B1* | 3/2018 | Hoffer ...................... G16H 40/67 |
| 10,228,936 | B2* | 3/2019 | Suparna .................... G06F 8/60 |
| 10,585,656 | B1* | 3/2020 | Das ...................... G06F 9/45558 |
| 10,816,964 | B1* | 10/2020 | Boone ................ G05B 23/0259 |
| 10,956,213 | B1* | 3/2021 | Chambers ............. G06F 9/4881 |
| 2002/0194181 | A1 | 12/2002 | Wachtel |
| 2005/0097517 | A1 | 5/2005 | Goin et al. |
| 2006/0130056 | A1 | 6/2006 | Bozak et al. |
| 2007/0162904 | A1 | 7/2007 | Kimmerly |
| 2007/0174101 | A1 | 7/2007 | Li et al. |
| 2008/0034354 | A1 | 2/2008 | Brughton et al. |
| 2008/0126161 | A1 | 5/2008 | Willis et al. |
| 2009/0300423 | A1 | 12/2009 | Ferris |
| 2010/0293550 | A1 | 11/2010 | Gnanasambandam et al. |
| 2011/0239214 | A1 | 9/2011 | Frields et al. |
| 2013/0055253 | A1 | 2/2013 | Jubran et al. |
| 2013/0227526 | A1 | 8/2013 | Imrey et al. |

OTHER PUBLICATIONS

Chaturvedi et al, "An Empirical Validation of the Complexity of Code Changes and Bugs in Predicting the Release Time of Open Source Software", IEEE, 1201-1206 (Year: 2013).*

Chavez, "A Decision-Analytic Stopping Rule for Validation of Commercial Software Systems", IEEE, pp. 907-918 (Year: 2000).*

Khatri, "Validation of a Patient Headache Care Education System (PHCES) Developed from a Unified Modeling Language (UML) Domain Model", IEEE, pp. 296-298 (Year: 1999).*

Beyer et al., "Witness Validation and Stepwise Testification across Software Verifiers", ACM, pp. 721-733 (Year: 2015).*

"Continuous Integration", Retrieved at <<http://www.openmakesoftware.com/continuous-integration/>>. Retrieved Date : Feb. 22, 2013, pp. 3.

"Jumping into Continuous Delivery with Jenkins and SSH", Retrieved at <<http://blog.akquinet.de/2012/01/10/jumping-into-continuous-delivery-with-jenkins-and-ssh/>>, Jan. 10, 2012, pp. 6.

"Managing Workflows", Retrieved at <<http://docs.urbancode.com/anthill3-help-3.7 html/ManagingWorkflows.html#triggeredandscheduledbuilds>>, Jun. 5, 2012, pp. 14.

"Scheduling and Running Workflows", Retrieved at <<http://www.info-etl.com/course-materials/scheduling-and-running-workflows>>. Retrieved Date : Feb. 22, 2013, pp. 4.

"Take Charge of Your Release with Go", Retrieved at <<http://www.thoughtworks-studios.com/go-continuous-delivery/features-benefits>>. Retrieved date : Feb. 26, 2013, pp. 16.

Annelise Reynolds, "Atlassian Launches Bamboo 4, Continuous Integration Server: Developers Can Now Test More, Configure Less", Retrieved at <<http://www.atlassian.com/de/company/press/press-releases/Atlassian-Launches-Bamboo-4-Continuous-Integration-Server-Developers-Can-Now-Test-More-Configure-Less0>>, Mar. 29, 2012, pp. 2.

Bakal, et al., "Continuous Integration in Agile Development", Retrieved at <<http:www.ibm.com/developerworks/rational/library/continuous-integration-agile-development/index.html>>. Aug. 14, 2012, pp. 6.

Humble, et al., "The Deployment Production Line", Retrieved at <<http://continuousdelivery.com/wp-content/uploads/2011/04/deployment_production_line.pdf>>, Agile Conference, Jul. 2006, pp. 6.

Robert J. Moore, "Evolving to a "Lighter" Software Process: A Case Study", In proceedings of Annual NASA Goddard Software Engineering Workshop, Nov. 27, 2001, pp. 14-21.

Written Opinion of the International Preliminary Examining Authority in corresponding PCT Application No. PCT/US2014/022232, dated Mar. 30, 2015, 6 pages.

"International Search Report & Written Opinion for PCT Patent Application No. PCT/US2014/022232", dated Jul. 8, 2014, Filed Date: Mar. 10, 2014, 9 Pages.

"Final Office Action Issued in U.S. Appl. No. 13/828,842", dated Jan. 7, 2015, 33 Pages.

"Final Office Action Issued in U.S. Appl. No. 13/828,842", dated Feb. 12, 2016, 35 Pages.

"Non Final Office Action Issued in U.S. Appl. No. 13/828,842", dated Jul. 8, 2015, 33 Pages.

"Non Final Office Action Issued in U.S. Appl. No. 13/828,842", dated Jun. 19, 2014, 30 Pages.

"Notice of Allowance Issued in U.S. Appl. No. 13/828,842", dated Nov. 17, 2017, 8 Pages.

"Office Action Issued in Chinese Patent Application No. 201480014760.6", dated Feb. 2, 2018, 15 Pages.

U.S. Appl. No. 13/828,842, filed Mar. 14, 2013, Marwan E. Jubran, Aleksandr Gershaft, Maksim Libenson.

* cited by examiner

SOFTWARE RELEASE WORKFLOW MANAGEMENT

CROSS-REFERENCE TO RELATED APPLICATION

This application is a continuation application of co-pending U.S. patent application Ser. No. 13/828,842, entitled "Software Release Workflow Management" and filed on Mar. 14, 2013, the entire disclosure of which is hereby incorporated by reference.

BACKGROUND OF THE DISCLOSURE

Brief Description of Related Technology

Software development typically involves a build process that compiles source code files into binary packages for release to a production or delivery environment. Some software development projects may involve thousands, or even hundreds of thousands, of source code files having a complex dependency structure. A change in one source code file may thus cause undesirable conditions or unexpected results and failures for a large number of other source code files.

A software release typically includes one or more validation or testing procedures during which the results of a software build are tested. Software releases of complex products also usually involve multiple environments in which such testing occurs. For example, after a development team indicates that the source code development has reached a certain milestone, the software product is often sent to an integration environment in which a given component is tested against dependent systems or multiple development branches are tested. In some cases, after the integration environment, the software product may be released to a staging environment for further validation before eventually moving to a production environment.

SUMMARY OF THE DISCLOSURE

Methods, systems, and computer program products are directed to managing a software release workflow. One or more gating rules may be used to automate the management of the software release workflow.

In accordance with one aspect of the disclosure, successive instructions to a plurality of software engineering systems are implemented in a release pipeline for a software product based on whether a gating rule for the software product is met.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
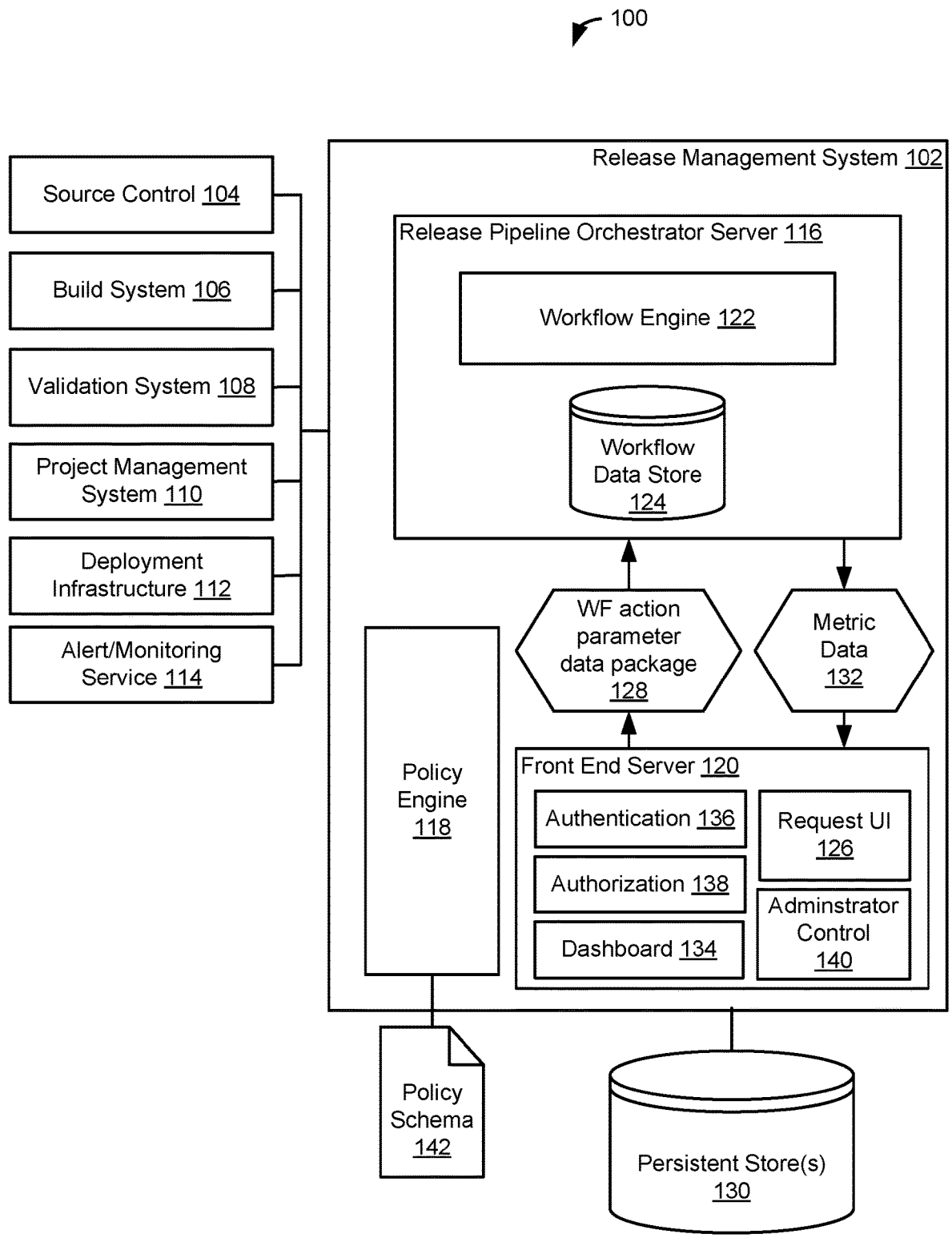
FIG. 1 is a block diagram of an exemplary system configured for software release workflow management in accordance with one embodiment.

While the disclosed systems and methods are susceptible of embodiments in various forms, specific embodiments are illustrated in the drawing (and are hereafter described), with the understanding that the disclosure is intended to be illustrative, and is not intended to limit the invention to the specific embodiments described and illustrated herein.

DETAILED DESCRIPTION

Methods, systems, and computer program products are described for managing a release of a software product. The management of the release is supported via workflows directing the operations of multiple software engineering systems involved in the release. The workflows of the disclosed embodiments establish a release pipeline that integrates the services of the software engineering systems. Implementation of the release pipeline is automated by the disclosed embodiments despite the often complex nature of the services provided by the software engineering systems, which may involve internal workflows of their own.

Interaction with the software engineering systems and execution of the workflow is automated via the application of a number of policy or gating rules. The gating rules may provide decision logic and other customizations to support an efficient implementation of the workflow. For example, execution of the workflow may include automated checks for various compliance parameters, such as whether the correct individuals have approved the release or a specific step of the workflow. Other automated checks may involve policies or rules related to quality assurance. The workflow may thus include, direct, and otherwise control different aspects or phases of the release lifecycle, such as a build process and a validation process. The disclosed embodiments may also automate the definition of a release pipeline via a front end or user interface and/or other interfaces (e.g., an application programming interface (API)) through which a release request is received or obtained to initiate a release.

The disclosed embodiments may be employed to improve the efficiency of the entire release process or cycle. The disclosed embodiments automate the release process beyond automation of the procedures implemented within a specific one of the software engineering systems (e.g., build automation). The automation of the entire release cycle provided by the disclosed embodiments may enable software developers to release software products more quickly and more often without sacrificing other interests, such as maintaining compliance and security. For example, with the disclosed embodiments, release transactions and other actions need not be tracked or implemented via emails, spreadsheets, or other inefficient, manual processes. By removing such manual steps in the release process, an agile, seamless, or continuous release experience may be provided via the disclosed embodiments. The efficiency improvements may also be facilitated through scaling (e.g., cloud-based scaling) and/or higher availability (e.g., protection against local or regional outages) of the release management services provided by the disclosed embodiments.

Notwithstanding references herein to various commercially available software engineering services managed via the disclosed embodiments, the disclosed embodiments are not limited to any particular type of engineering service or provider thereof. Although described in connection with cloud-based services, the disclosed embodiments are not limited to any specific operating system, environment, platform, or computing infrastructure. The disclosed embodiments may be used to manage the release of various types of software products.

The nature of the releases managed via the disclosed embodiments may vary. For example, a release need not involve a full or complete release of a software product to production. Instead, the release may involve a partial release, such as a patch, hotfix or quick fix update to the software product, or a configuration change. The final stage or destination of the release need not involve production or deployment. For example, the release may be an internal release between release environments within the manufacturer, such as an integration environment and a staging environment.

FIG. 1 depicts a software development environment 100 for development of one or more software products. The software development environment 100 includes a release management system 102 or service configured to manage a software release workflow. The software development environment 100 includes a plurality of software engineering systems used during the software development process. Various combinations of the software engineering systems may be applied to the software product in a release pipeline established by the release workflow. The software engineering systems may be discrete systems or integrated to any desired extent. For example, one or more of the software engineering systems may be provided as a separate software service. In this example, the software engineering systems include a source control system 104, a build system 106, a validation system 108, a project management system 110, a deployment infrastructure 112, and an alert system 114. Additional, fewer, or alternative systems may be provided. For example, the software engineering systems may include a content distribution service configured to distribute build outputs (e.g., binary files, configuration data, and other artifacts) to various distributions (e.g., worldwide) and to provide services, such as a build directory service, which may discover builds and use validations to ensure the integrity of content is retained upon delivery. Such content distribution services may be integrated with the build system 106, the deployment infrastructure 112, or be configured as standalone services.

Each of the software engineering systems is configured to process data indicative of the software product(s) under development. One or more of the software engineering systems may be provided as a service (e.g., in a client-server framework) or otherwise involve a distributed computing infrastructure. One or more of the software engineering systems may thus be provided or supported via a cloud or other networked computing arrangement. For example, the build system 106 may be configured in accordance with the teachings of U.S. Patent Publication No. 2013/0055253 ("Cloud-based Build Service"), the entire disclosure of which is hereby incorporated by reference. The software engineering systems need not be provided separately as shown in FIG. 1. The software engineering systems may be integrated to any desired extent. For instance, some or all of the software engineering systems may be coupled in one or more ways. In some examples, the coupling may involve a shared repository or other resource and/or involve interaction or communications, such as via an API. For example, one or more source control services, one or more project management services, and/or other services may be provided via a common server, such as a server configured in accordance with the Team Foundation Server platform from Microsoft Corporation, which may be provided as part of a Visual Studio® system, such as the Visual Studio® Application Lifecycle Management system.

The source control system 104 may be directed to version or revision control and other management of the source code for the software product. In one example, the source control system 104 utilizes the Perforce revision control system (Perforce Software, Inc.), but any source control system may be used. The source control system 104 may include one or more repositories for the source code data or files. The repositories may be local or distributed. For example, the repositories may be located and arranged in a cloud infrastructure. The source code may be written in any one or more languages, and the platform or operating system for the source code may also vary.

The build system 106 may be directed to automating the process of compiling the source code data into binary code, and packaging the binary code. The build system 106 may include a number of tools and repositories for processing and handling the source code and binary code files and data. For example, the build system 106 may include, configure, or access a file server in which the results of a build are stored. Any build software, tool, and/or infrastructure may be used in the build system 106. In one example, the build system 106 utilizes the MSBuild build platform (Microsoft Corporation), which may be available via or in conjunction with the Microsoft® Visual Studio® integrated development environment. Other build systems and/or integrated development environments may be used.

The validation system 108 may be directed to validating the operability of the binary code, which may include a set of binaries. The validation system 108 may be configured to execute a number of tests configured to determine whether the binary code works as intended. For example, one or more tests may be configured to determine whether the binary code meets a number of specifications for the software product. A variety of different types of testing may be provided, including, for instance, unit testing, functional testing, stress testing, fault injection, penetration testing, etc. Other types of validation processes may be implemented by the validation system 108, including, for example, compliance validation and security validation.

The project management system 110 may be directed to gathering, tracking, and/or storing data indicative of a record of the release process. For example, work item tracking, incident tracking, deployment tracking, and other item tracking may be implemented by the project management system 110 to support the execution of the release pipeline. The project management system 110 may be used to provide a signal or other data to the release management system 102 to indicate that a particular action is complete, complete with faults, etc. The project management system 110 may alternatively or additionally be configured to provide logging functionality for the release management system 102. Such logging may be useful in a variety of ways. For example, the log data may include, for example, compliance data, such as the identity of a user who approved a step in the release process. The project management system 110 may include a repository, such as a persistent store, in which such log and other release process data is stored. The project management system 110 may include a manager (e.g., a database manager) and user interface for accessing, handling, or otherwise processing the release process data (e.g., generating business intelligence reports). The project management system 110 may include a Microsoft® SQL Server® or SQL Azure™ database management system from Microsoft Corporation, but other database management systems or architectures may be used. In some examples, the project management system 110 may include the above-referenced Team Foundation Server platform from Microsoft Corporation, but other services may be used.

The deployment infrastructure 112 may be directed to an automated deployment of the software product. The deployment infrastructure 112 may include a gateway or other service configured to support software product updates. For example, if the software product is configured for cloud-based execution, the deployment infrastructure 112 may include a service for distributing the software product to one or more data centers, virtual machines, etc. The software development environment 100 need not include the deployment infrastructure 112 in some cases, such as when the software product is not electronically distributed.

The alert system 114 may include an alert or monitoring service to support communications with users beyond any dedicated or other user interfaces of the release management system 102. The communications may include alerts and other messages to inform users of an event, such as a failure (e.g., a build failure), that occurs during implementation of a workflow. The messages may utilize a variety of communication protocols and media, including, for instance, emails and text messages, but other messaging frameworks may be used. The alert system 114 may be a cloud-based monitoring service, such as the Windows Azure™ Alert and Incident Monitoring Service (AIMS) from Microsoft Corporation, but non-cloud monitoring services may be used.

Figure 2:
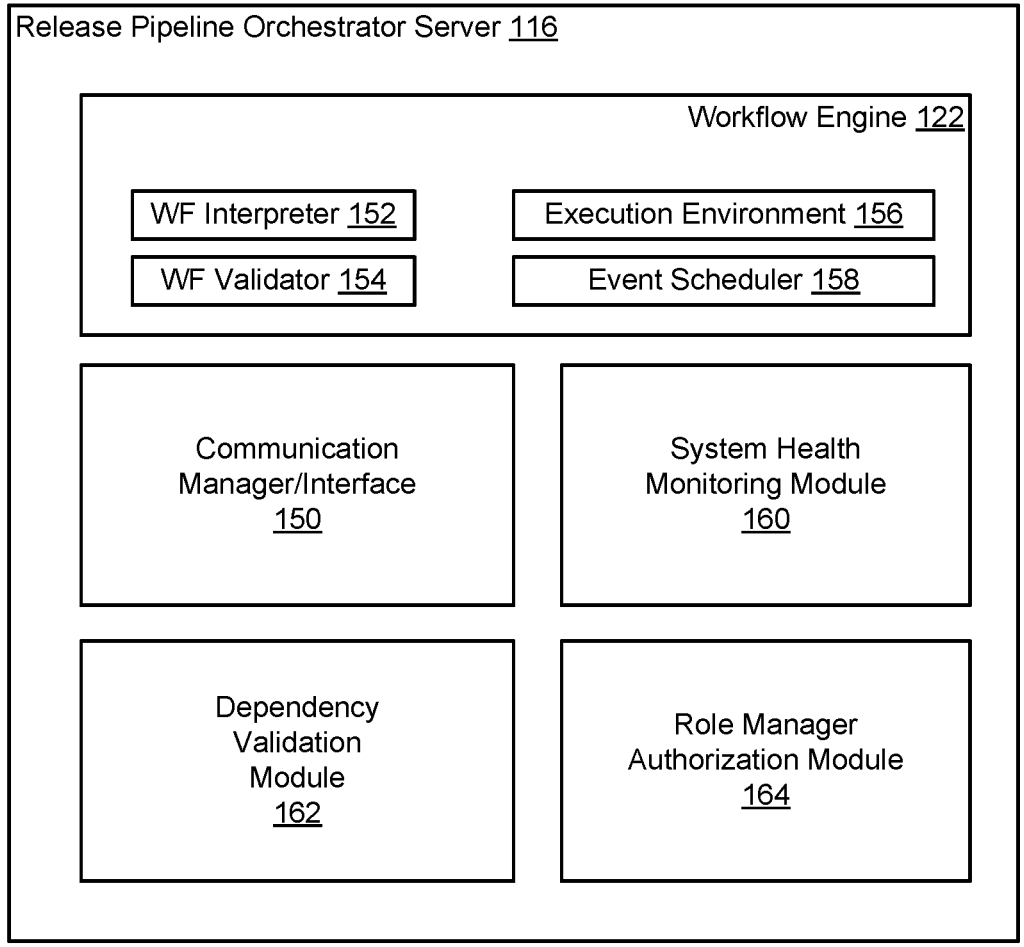
FIG. 2 is a block diagram of a release pipeline orchestrator of the system of FIG. 1 in accordance with one embodiment.

In some embodiments, one or more functions of the alert system 114 may be integrated with the release management system 102. For example, monitoring and/or evaluation of the release process (e.g., to detect events warranting an alert) may be implemented by a module of the release management system 102. The embodiment of FIG. 2 provides some examples of such monitoring. The alert system 114 may then be instructed to transmit an email or other message regarding the event detected.

In the embodiment of FIG. 1, the release management system 102 includes an orchestrator 116 (or orchestrator server), a policy engine 118, and a front end system 120 (or front end server). The orchestrator 116 may be configured to direct or otherwise communicate or interact with a combination of the above-referenced software engineering systems to establish a release pipeline. The orchestrator 116 may support or facilitate communications between the software engineering services. The policy engine 118 may be configured to apply or enforce gating rules or other policies or decision logic during the release process. The front end system 120 may be configured to support user configuration of the release management system 102, monitoring of the release process, and other user interaction with the release management system 102. The components of the release management system 102 may be implemented on separate computers (e.g., server computers) or computing systems (e.g., sets of server computers), or on a common computer or computing system. Each such computer or computing system may be configured as a virtual machine.

One or more of the components of the release management system 102, e.g., the orchestrator 116, may be configured to manage multiple release pipelines for one or more software products. As described herein, the release management system 102 may be configured to provide the release management services in a parallel processing architecture or arrangement. For example, the release management system 102 may include multiple instances of the orchestrator 116 to orchestrate multiple release pipelines for one or more software products. Similarly, the release management system 102 may include multiple instances of the policy engine 118 and/or the front end system 120. The multiple instances may be arranged in a cloud-based service framework that allows the number of instances to be scaled in accordance with demand. The components of the release management system 102 may be integrated to any desired extent. For example, the policy engine 118 may be an integral part of the orchestrator 116. In some cases, various combinations of the services provided by the orchestrator 116, the policy engine 118, and/or the front end system 120 are implemented on a common computer (e.g., server computer) or computing system.

The orchestrator 116 may include a workflow engine 122 to implement workflows involving the above-described software engineering services. The workflow engine 122 may correspond with the workflow manager provided as a part of the Microsoft® Windows® Workflow Foundation framework from Microsoft Corporation, although other workflow managers or engines may be used. As described below, the workflow engine 122 and/or the orchestrator 116 are configured to manage communications with the software engineering services, process workflow parameter data to provide a workflow to implement a release pipeline configured in accordance with such workflow parameter data, and execute the workflow to send instructions to the software engineering systems. For example, the parameter data may specify that the release pipeline be configured to include an integration step, a build step, a deployment step, and a code movement step. In another example, the parameter data may specify that the release pipeline be configured to include a code movement step, a build step, a validation step (e.g., for unit testing), a deployment to integration step, a further validation step (e.g., for functional, stress, and penetration testing for validation of a service), a further code movement step, and a deploy to production step. The steps and step order in the release pipeline may vary considerably. For example, other release pipelines may not have code movement steps due to the absence of a branching architecture. Some steps need not involve processing of code for the software product. For example, other pipelines may include instructions for gathering and displaying metrics regarding the release, as described below.

Data indicative of and/or resulting from the workflows, such as temporary or log data, may be stored in a workflow data store 124. The temporary data may be indicative of the workflow execution, which may be useful to support recovery in the event of a failure. The workflow data store 124 may include one or more local data stores or a distributed data store in communication with one or more processors used to implement the workflow engine 122.

Implementation of the release workflow may be initiated via a request received or otherwise obtained via the front end system 120. The request may specify or otherwise include workflow action parameters or parameter data to define a release pipeline involving a combination of the above-described software engineering systems. For example, the request may specify a software product, one or more source control branches, file directories or other locations, one or more change lists, one or more release environments (e.g., a target environment), and a combination of actions (e.g., build, validate, deploy, validate, etc.) to be implemented in the release. In the embodiment of FIG. 1, the front end system 120 may be configured to generate a user interface 126 to support the entry of the request and the workflow action parameter data. A workflow action parameter data package 128 may be passed from the front end system 120 to the orchestrator 116 and/or the workflow engine 122. The workflow action parameter data package 128 may include parameters or data indicative of or specifying one or more aspects of the release pipeline or the workflow. The parameters or data may include data in addition to that provided via the request or the user interface 126. The workflow action parameter data package 128 may be configured as a release specification. In some cases, the workflow action parameter data package 128 is received by the orchestrator 116 via an API end point of the orchestrator 116. Other communication schemes may be used. For example, the workflow action parameter data package 128 may be derived from a user interface input process that provides a user an opportunity to reuse or otherwise select a previously used workflow, workflow action, or other workflow parameter or data.

The release pipeline and the workflow may be defined by the orchestrator 116 and/or the workflow engine 122 in accordance with the workflow parameter data in the workflow action parameter data package 128. For example, the orchestrator 116 and/or the workflow engine 122 may incorporate the workflow parameter data into a workflow template. The orchestrator 116 and/or the workflow engine 122 may be configured to select a template from a plurality of templates stored in, e.g., the workflow data store 124. The selection of the template may be based on one or more aspects of the workflow parameter data, such as the combination of actions requested. In one embodiment, a template is provided for each respective release environment (e.g., a test environment, a production environment, etc.). The front end system 120 may be configured to facilitate modifications to the workflow templates. In some embodiments, an API may be provided to facilitate an upload of one or more workflows for selection. Alternatively or additionally, the workflows may be modified during execution thereof.

During the implementation of the release workflow, a record of the workflow actions or steps executed may be stored by the release management system 102 in a persistent store 130 in communication with the orchestrator 116 and/or the release management system 102. The persistent store 130 may be provided by a cloud-based storage service. The persistent store 130 may be configured for durable storage of a variety of different types of data. For example, data indicative of each workflow action implemented during the workflow, as well as the results of each action, may be recorded or stored in the persistent store 130. For instance, the binary files resulting from a build may be stored in the persistent store 130. The workflow may be configured with one or more checkpoints at which data indicative of the state of the release is stored in the persistent store 130. If a failure occurs after the checkpoint, the data stored at that time may be relied upon to restart the workflow from the checkpoint. The data stored at a checkpoint may also be used to support the execution of multiple instances of the release pipeline. The data may also be used for scalability. For example, a workflow started on a first server may be resumed by another server, if, for instance, the first server becomes overloaded or is taken out of service (e.g., through maintenance or by failure).

Other types of result data may be stored by the release management system 102 in the persistent store 130. For example, result data identifying storage locations for the build results may be recorded in the persistent store 130. In another example, the result data may be indicative of the status or other operational characteristic of the workflow or release. The operational characteristic(s) to be recorded or gathered may be identified in the request received via the front end system 120. The persistent store 130 may provide storage redundancy for one or more types of data stored in the workflow data store 124.

Metric data 132 indicative of the release workflow(s) may be returned from the release management system 102 or the workflow engine 122 to the front end system 120. The front end system 120 may, in turn, pass the metric data 132 to the persistent store 130. The metric data 132 may alternatively or additionally be stored directly in the persistent store 130 or through a different intermediary device or system, such as the above-referenced monitoring system or other monitoring system or service. The metric data 132 may be alternatively or additionally provided to the user via a dashboard 134 generated by the front end system 120. The metric data 132 may be indicative of the progress, status, or other operational characteristic of the release workflows being managed by the release management service 102. For example, the metric data 132 may be representative of how long a particular step of a release took to execute, of how many releases are currently being executed, or of the results of one or more tests at varying levels of specificity (e.g., either individual or aggregated test results). One or more characteristics of the metric data 132 may be specified via the user interface 126. For instance, the user requesting a release may specify the types of metric data 132 to be displayed via the dashboard 134. The front end system 120 may be configured for telemetric communications with the orchestrator 116 to support the gathering of the metric data 132.

A request for the metric data 132 may be provided or received at various times. The metric data 132 may be requested along with the request to initiate a release workflow. Thus, in some embodiments, the workflow action parameter data package 128 includes data indicative of the types of metric data 132 requested. Alternatively or additionally, a request for the metric data 132 may be received via the user interface 126 after the initiation of the workflow. The front end system 120 may then be configured to send a message to the orchestrator 116 requesting the metric data 132. The message may include instructions to gather the metric data 132. The request may be received by the orchestrator by the above-referenced API end point. The metric data 132 may alternatively or additionally be used to trigger automatic alerts about, e.g., system states. For example, an alert may be triggered in the event that the metric data 132 indicates that the duration of a certain process in the system exceeds a predetermined threshold. The data may also be aggregated and reported at a later time across multiple releases.

The persistent store 130 may be used by the release management system 102 as a long term data storage for some or all of the data stored in the workflow data store 124. The workflow data may include log data. The log data may include data recorded for compliance purposes, including, for instance, the identity of each person providing approval during the workflow. The release management system 102 may be configured in accordance with auditing data of, e.g., a retention or other compliance policy, to maintain the data in the persistent store 130 for a time period specified via the auditing data. Any number of stores may be used to provide capacity for the storage of data from a number of releases. For example, the persistent store 130 may include a varying number of data stores in a cloud-based framework or other distributed computing architecture. The data may also be recorded by or as part of the project management system 110, which may be useful in, for instance, correlating a release with work items, incidents, or other workflow events.

The front end system 120 may provide functionality beyond requesting releases and dashboard displays. In the embodiment of FIG. 1, the front end system 120 includes an authentication module 136 and an authorization module 138. The authentication module 136 is configured to authenticate users of the release management system 102. The authentication module 136 may be configured to access one or more user directories (e.g., a corporate user directory) or other databases to confirm user credentials. The authorization module 138 may be configured to establish or determine user permissions or roles, and the permissions of such roles, which may then be associated with specific users. In some embodiments, each authenticated user may be assigned to a user role having a set of permissions to, e.g., approve certain workflow actions, as described further below. User or user role permissions may be specified via an administrator control interface 140 generated by the front end system 120. Alternatively or additionally, user permissions may be specified indirectly, e.g., via a remote service. For example, the user permissions may be specified in accordance with a title (e.g., project manager) indicated via data made available by the database(s) relied upon for authentication. The user may also have a different role (e.g., approver, initiator, developer, etc.) based on the origin, scope, or other aspect of the release, as described herein. The authentication module 136 and the authorization module 138 may be configured to access a federated database system or architecture.

Data indicative of a user who approved a particular workflow action may be stored in the persistent store 130 and/or the workflow data store 124. A complete record of the approvals provided during each release workflow may thus be stored, which may be useful for compliance with corporate, governmental, or other regulations.

The administrator control interface 140 may be configured to allow an administrator or other authorized user to control other aspects of the release management system 102. In some embodiments, the administrator control interface 140 may provide various workflow control options. For example, a user may direct the workflow engine 122 to suspend, resume, or cancel one or more releases via the administrator control interface 140. Suspension of one or more releases may be useful in the event of, for instance, a failure (e.g., test failure) in one development branch that may have adverse impacts in other branches. The administrator control interface 140 may alternatively or additionally be used to override a variety of different actions automated via the release management system 102. For example, a workflow action specified via a template workflow may be skipped or otherwise cancelled. An override to lock any further workflow progress may be useful in certain situations, such as an outage that, until addressed, may adversely impact subsequent releases for the software product involving other clusters.

The policy engine 118 may provide control logic for the release management system 102. The control logic may be called or otherwise relied upon to determine whether to proceed with a workflow action in the release workflow. The control logic may include or be configured as a set of policy or gating rules. In this embodiment, the gating rules are set forth in a policy schema 142. The policy schema 142 may be configured as a data file or document, such as an extensible markup language (XML) document. The format, language, and other characteristics of the policy schema 142 may vary. The policy engine 118 may access a variety of different policy or configuration specifications to obtain the gating rules. With a particular gating rule of the policy schema 142 available, the policy engine 118 is configured to direct the orchestrator 116 and/or the workflow engine 122 to send a successive instruction based on whether the gating rule is met. Alternatively or additionally, such direction of the orchestrator 116 and/or the workflow engine 122 may follow a request sent to the policy engine 118 from the orchestrator 116 and/or the workflow engine 122 on whether to proceed with a successive step in the workflow.

The policy schema 142 and/or the gating rules may be used to customize or configure the release workflow. Such customization may be at a high level. For example, the release workflow may be configured as a test workflow (e.g., a test to release workflow), a release-to-production workflow, or other release workflow. Such high level customization may be determinative of which software engineering systems are involved or included in the release pipeline and, in some cases, the order in which such systems are called upon.

The policy schema 142 and/or gating rules may customize the release workflow at an intermediate level in which the operation of the software engineering systems is configured. For example, the policy schema 142 may specify a test schema or set of tests to be implemented by the validation system 108. A workflow may be designed to implement only certain tests (or types of tests) made available by the validation system 108. Alternatively or additionally, the policy schema 142 and/or the gating rules may be configured to initiate an automated test selection routine, in which the tests (or types of tests) are selected based on environmental variables or other parameters of the release. For example, the test selection routine provided in the Team Foundation Server platform from Microsoft Corporation may be used.

Even more detailed levels of logic may be specified via the gating rules. For example, the policy schema 142 may include a gating rule specifying a code coverage threshold (e.g., 50% pass or 70% pass) to be met during validation. If the code coverage is below the threshold, then the workflow does not proceed to the next workflow action (e.g., a subsequent test, a deployment, etc.). The orchestrator 116 may instead send an instruction to the alert system 114 regarding the code coverage failure. In another example, the policy engine 118 may be configured via the policy schema 142 to apply gating rules regarding a state of a production environment. The policy engine 118 may instruct the orchestrator 116 to validate that the state of the production environment before releasing a build of the software product to the production environment. The policy schema 142 may specify one or more validation criteria as gating rules for the validation process. In yet another example, a gating rule may be used to specify a location (e.g., a specific cluster) to which the software product is to be deployed and/or the circumstances under which such deployment occurs. A variety of other parameters for the release workflow and pipeline may be specified via the gating rules, including, for instance, whether the build results are to be replicated based on which code branch is built, and when or where to implement forward or reverse integration across branches.

The policy engine 118 may be directed to verification and quality assurance enforcement. In some embodiments, the gating rules are used by the policy engine 118 and/or the orchestrator 116 to determine whether a workflow incident occurs. Failure to meet a gating rule may cause an alert (e.g., a text message, email, or other message) to be sent to a user(s) authorized to respond to the workflow incident. The user(s) to which the alert is sent may be determined via the policy schema, the workflow, the workflow action parameter data package 128, and/or data specified via the authorization module 138. For example, the authorization module 138 may be used to establish that only users having project manager or higher roles are authorized to respond to workflow incidents of a certain level. The policy schema 142 may be relied upon to classify the various workflow incidents by level. The workflow engine 122 may be configured to resume the workflow based on a response to the alert from an authorized user.

The policy schema 142 (or other logic source) may include or specify a variety of transition criteria for the release workflow. Some transition criteria may be configured or applied as entry criteria. A gating rule may specify that a certain condition is met before allowing a workflow action to begin. For example, a condition may specify that a user having a Security Expert role provides signoff that a release has been reviewed for compliance with security practices, that appropriate Secure Development Lifecycle (SDL) tools from Microsoft Corporation (or other security assurances processes) have been run on the code to verify proper processes, or that code review has been done for the change by appropriate person(s) as specified by a compliance policy. Other gating rules may be configured or applied as exit criteria. A gating rule may specify that a certain condition is met before allowing a workflow action to be completed. For example, a condition may specify that continuous testing showed proper results (e.g., in accordance with service level agreement (SLA) restrictions) for all actions, or that no customer-impacting incidents were created during the time taken to validate the released changes (e.g., bake time), or that all of the service components entered steady-state and have not resulted in new failures.

The gating rules and, thus, the workflow policy, may be predetermined or predefined to support the implementation of the release workflow in a variety of ways. For example, the gating rules need not be specified via a discrete configuration file as shown in FIG. 1. One or more gating rules may instead be specified in a workflow template and/or the workflow action parameter data package 128. For example, the workflow action parameter data package 128 (or other source of the gating rules) may specify a code coverage threshold (e.g., 80%). In another example, the workflow action parameter data package 128 (or other source of the gating rules) may specify a location of the source code for processing. The decision logic for the gating rules may alternatively or additionally be specified via workflow instructions incorporated (e.g., hard-coded) into the workflow template. For instance, the gating rules may be partially or fully hard-coded into the workflow template.

The policy engine 118 may include an interpreter or other data processor configured to evaluate data indicative of the gate rules. In one embodiment, the data may be arranged in a set of classes, an object library, or other data structure. The data structure may be set forth in an XML or other framework in one or more data files. The interpreter or other data processor of the policy engine 118 may then be configured to read the data structure to determine or load the gate rules. Alternatively or additionally, data indicative of the gate rules is set forth in a dynamic link library (DLL) file(s) or other compiled or processed format. In some cases, the gate rules may be set forth as code, instructions, or other logic, rather than data used to configure or customize such logic.

FIG. 2 shows the orchestrator 116 and the workflow engine 122 thereof in greater detail. The orchestrator 116 may include a number of modules directed to interactions with the software engineering systems to achieve desired workflow results. In this example, the orchestrator 116 includes a communication manager 150 or other interface to support communications with the software engineering systems. The communication manager 150 may include or consult a lookup table or other logic to direct messages or other data exchanges to the appropriate software engineering system(s). The format, protocol, and other characteristics of the communications supported by the communication manager 150 may vary. For example, the communication manager 150 may send instructions to the software engineering systems via data exchanges configured in accordance with the capabilities of the software engineering systems, such as a respective API of the software engineering system. In some embodiments, interaction with an engineering system may be implemented by defining one or more interfaces that describe or reflect the capabilities of the engineering system. For example, an interface may be configured in accordance with the expected capabilities of the above-referenced source control system. The interface may then be customized or otherwise implemented to support data exchanges (e.g., data retrieval) with specific instances of the source control system.

The communication manager 150 may also be configured to support interaction with other components of the release management system 102 (FIG. 1), such as the policy engine 118 (FIG. 1) and/or the front end system 120 (FIG. 1). For example, the communication manager 150 may provide an interface for receiving and processing the workflow action parameter data package 128 (FIG. 1) and/or other workflow action parameter data. Alternatively or additionally, the communication manager 150 may be configured to receive and process data indicative of the results of the application of the gating rules by the policy engine 118.

The workflow engine 122 may be configured to generate the instructions sent by the communication manager 150 and/or process the messages received by the communication manager 150. In this embodiment, the workflow engine 122 includes a workflow interpreter 152, a workflow validator 154, an execution environment 156, and an event scheduler 158. The workflow interpreter 152 may be configured to interpret workflow code authored in a workflow language, such as the workflow language established as part of the Microsoft® Windows® Workflow Foundation framework. Any workflow language may be used. The workflow language may define a set of primitive instructions configured to implement basic workflow actions (e.g., skip, cancel, run, run in a loop, run in parallel, change, etc.). The workflow language may be defined or based upon code written in the C # language and/or in XML script, although other high-level languages may be used. The workflow engine 122 may also include a compiler if the workflow code is presented in an intermediate language for which a compiler is not already available.

The workflow validator 154 may be one of several tools provided by the workflow engine 122 to author, modify, customize, or otherwise prepare a workflow or workflow template for implementation in the execution environment 156. The workflow validator 154 may be integrated with the workflow interpreter 152 to any desired extent. Once a workflow (or workflow template) has been validated, the workflow may be made available for implementation within the execution environment 156. The execution environment 156 may be based on or include the Common Language Runtime (CLR) environment of the Microsoft® .NET framework and/or Microsoft® Windows® operating system, but other software runtime environments and frameworks may be used.

In some embodiments, the workflow engine 122 is configured to call the policy engine 118 (FIG. 1) to incorporate the gating rules into the workflow during execution of the workflow (e.g., in the execution environment 156). The workflow may thus be configured or customized on the fly. Alternatively or additionally, data indicative of the gating rules (and/or other parameter data) is incorporated into the workflow before the execution environment 156 is implemented.

The workflow engine 122 and/or other components of the orchestrator 116 and the release management system 102 may be implemented in a cloud-based framework in which multiple virtual machines are implementing and managing a number of workflows. The cloud-based framework may be configured in a manner similar to the cloud-based service described in the above-referenced U.S. Patent Publication. For example, the cloud-based framework may provide a hosted service, such as a Windows Azure™ hosted service, with a scalable number of virtual machines providing multiple instances of an orchestrator role, a policy engine role, and/or a front end role of the release management system 102. The cloud-based framework may be useful for supporting parallel processing of one or more steps or actions of the release workflow. For example, virtual machines within one or more data centers may be used to implement validation testing in parallel. The workflow engine may be executed across multiple machines (virtual or physical), which may facilitate transfers of workflows across the machines, e.g., through the above-referenced persistent store and/or other predetermined persistence points. Such transfers may provide increased scalability in which many workflows are executed in parallel and/or increased resiliency to failure (e.g., when a machine executing a particular workflow fails).

The orchestrator 116 may include a number of modules directed to monitoring the execution of the workflows. In this example, the orchestrator 116 includes a system health monitoring module 160 and a dependency validation module 162. Additional, fewer, or alternative monitoring modules may be provided. In some cases, one or more of the modules may be provided as a component of the policy engine 118 (FIG. 1) rather than the orchestrator 116. For example, the policy engine 118 may include the dependency validation module 162. Either way, the policy schema 142 (FIG. 1) may be used to declare dependencies or other constraints (e.g., an upgrade order) for the software product.

The monitoring modules may be configured to detect an event, such as a failure, during the execution of a workflow that warrants an alert or other action. The system health monitoring module 160 may be configured to monitor the health or other state of the computing system implementing the orchestrator 116 (or any one or more components thereof). The system health monitoring module 160 may thus be configured to detect improper operating conditions and other conditions that may adversely impact the execution of the workflow. For example, the system health monitoring module 160 may be relied upon to detect when the computing resources (e.g., processor or memory capacity) of the computing system are inadequate for the load provided by the workflow. If a system health parameter does not meet a threshold, an alert or other message may then be sent to a user authorized (e.g., via the policy schema 142 (FIG. 1)) to respond. In some cases, the system health monitoring module 160 may be configured to direct the workflow engine 122 to suspend the workflow. The workflow may then resume based on a response to the user alert or other user instruction.

Other components or aspects of the release environment may alternatively or additionally be monitored. The release environment may be an environment in which the software product is being used and, thus, subject to an SLA prohibiting or limiting downtime. In this example, the dependency validation module 162 is configured to validate and otherwise monitor a state of a production environment before releasing a build of the software product thereto. The validation may be based on one or more validation criteria specified in the policy schema 142 (FIG. 1). For example, the validation criteria may involve or specify a number of dependencies for the portion of the software product to be released. The dependency validation module 162 may be configured to determine a state of each dependency (e.g., determine a version of a component) and validate the state of the dependency before implementing the release (e.g., confirm that the version is compatible with the release). Such validation may avoid rendering the software product inoperable as a result of the release. The health of the operating environment governed by the SLA may thus be maintained.

The orchestrator 116 may include additional modules for supporting the management of the release workflow. In this embodiment, the orchestrator 116 includes an authorization module 164 directed to managing the permissions of users and/or user roles. The functionality of the authorization module 164 may alternatively or additionally be provided by one or more components of the front end system 120 (FIG. 1). The authorization module 164 may be integrated with such components to any desired extent. In some embodiments, the role management functionality described below may thus be provided by a component of the front end system 120.

The authorization module 164 may implement a role-based access management framework for the orchestrator 116 and other components of the disclosed systems. Users may be assigned roles to define, limit, or otherwise control the workflow actions, events, or other items with which the user may interact or control. For instance, a user assigned to a developer role may be prohibited from approving a release or deployment to production. The set of permissions may vary considerably with the nature of the actions involved in a release process. Some roles may be capable of initiating a forward integration within a release workflow, but not deployments. Some roles may initiate a build process, but not approve the results of a build.

The policy schema 142 (FIG. 1) may be used to establish rules for the roles. For example, the policy schema 142 may be used to allow only users assigned to a project manager role to approve a release for a certain software product. In this way, other roles may be capable of approving a release for other software products. Alternatively or additionally, the authorization module 164 and/or the authorization module 138 (FIG. 1) of the front end system 120 (FIG. 1) may be used to establish permissions for the roles. In some cases, the permissions may be global (e.g., across all software products, environments, etc.) or default values that may be customized or overridden by permissions specified via the policy schema 142.

A variety of different roles and permissions for such roles may be established via the authorization module 164. An administrator role may be defined to provide override and other control capabilities, including, for instance, those referenced above. Some roles may classify a user in accordance with a team involved in the software release process, such as an operations team or a testing team.

The authorization module 164 may include role manager functionality. For example, the authorization module 164 may be configured to map users to roles and/or permissions, and/or to map roles to software products. The role manager functionality may allow the authorization module 164 to apply permissions on a product-by-product basis. Users may thus be associated with one or more specific products and/or one or more specific services.

In some embodiments, the role access framework may include a data structure for classifying role membership, role access or permissions, and scope definition. The role membership data may specify which users belong to which role(s). Roles need not correspond with a corporate structure (e.g., project manager, etc.), but rather may be specific to the release process (e.g., approvers, initiators, etc.). Alternatively or additionally, the role membership data may specify the products or services with which the user is associated. The role membership data may also specify the scope of such associations, such as the components of such products or services with which the user is associated. A user may thus be associated with a team building a portal for the software product, but not a team building a software development kit for the same product. The role access data may specify the permissions for each role.

The front end system 120 (FIG. 1) may be used to establish the role access framework. For example, an administrator user may enter the role membership data, the role access data, and/or the scope definition data via the authorization module 138. Alternatively or additionally, such authorization data may be specified and/or managed via an external service (e.g., a directory service) or system, such as a cloud-based system or a corporate system.

Figure 3:
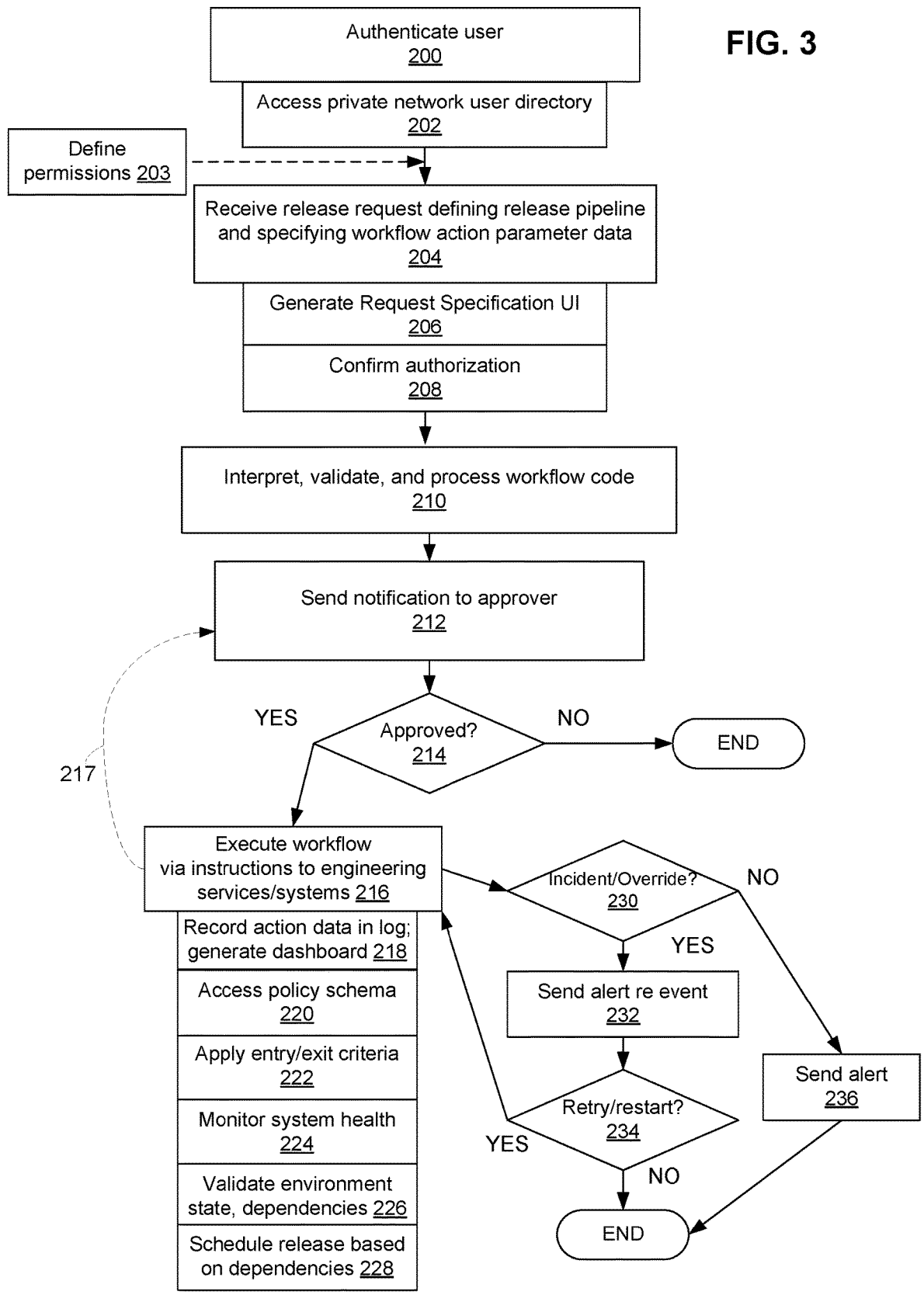
FIG. 3 is a flow diagram of an exemplary computer-implemented method for software release workflow management in accordance with one embodiment.

FIG. 3 depicts an exemplary method for managing a software release. The method is computer-implemented. For example, one or more server computers of the release management system 102 shown in FIG. 1 may be configured to implement one or more of the acts of the method. The implementation of each act may be directed by respective computer-readable instructions executed by a processor of the release management system 102 and/or another processor or processing system.

In the embodiment of FIG. 3, the method begins with an act 200 in which a user is authenticated. The user may be authenticated in connection with an attempt to access the release management system 102 (FIG. 1) via the front end system 120 (FIG. 1). The user may be accessing the release management system 102 for various reasons. Given the appropriate permissions, the user may access the release management system 102, for instance, to initiate, suspend, or cancel a release, to monitor an ongoing release, to configure or manage a release workflow, and/or to configure the release management system 102 (e.g., modify a template workflow). The authentication may be managed by the authentication module 136 (FIG. 1) of the front end system 136 and/or one or more external authentication systems (e.g., a federated database system). For example, the authentication process may include accessing a private network user directory in an act 202.

In some cases, an administrator user may access the release management system 102 to define the permissions of various user roles in an act 203. Data indicative of the permissions may be stored in, for example, the workflow data store 124 (FIG. 1) or other data store for subsequent access by the authorization module 138 (FIG. 1) and/or the authorization module 164 (FIG. 2). Additional or alternative authorization data may be stored. Data indicative of the permissions may be stored at another time, such as during an initial configuration session.

In act 204, a request is received or otherwise obtained for a release. The request specifies or includes workflow action parameter data to define a release pipeline involving a combination of software engineering systems. For example, a user may specify a software product to be released (including, e.g., a source code location), a target environment to which the software is to be released, an order of the software engineering systems in the pipeline, and/or a selection of a subset of such systems. Additional, fewer, or alternative workflow parameters may be specified in connection with the release request. Each software engineering system may be configured to process data indicative of the software product to be released, as described above.

The front end system 120 (FIG. 1) may facilitate the specification of the workflow action parameter data by generating the user interface 126 (FIG. 1) or other request specification user interface in an act 206. The layout and other characteristics of the user interface may vary. In some cases, the user interface may allow the user to create, modify, or otherwise configure a workflow for execution. The configuration may include entering workflow code to customize a template workflow to create a new workflow.

Once the workflow request and/or the workflow parameter action data is specified, the method may then include confirming that the user is authorized to initiate the workflow in an act 208. The authorization process may include determining a user role of the user and determining the permissions of the user role for a given software product. The permissions may be configured to authorize the user to initiate certain types of releases or workflow actions, but not others. The authorization process may be implemented by the authorization module 138 (FIG. 1) and/or the authorization module 164 (FIG. 2).

Code and/or data indicative of the workflow may be processed in an act 210. In some embodiments, the workflow may be based on a template workflow modified in accordance with the workflow parameter action data. The workflow template may be processed in preparation for execution once modified in accordance with the workflow parameter action data. The processing may include code interpretation, workflow validation, compilation, linking, and other code processing.

In some embodiments, an act 212 is implemented to obtain an approval or sign-off of the initiation of a release workflow before the execution of the workflow begins. For example, a notification may be sent to a user authorized to approve the release. The notification may include an email, a text message, or any other transmission. The notification may specify data indicative of the release workflow, including, for instance, one or more parameters specified via the workflow action parameter data, such as the release pipeline. A decision block 214 determines whether the release is approved. If yes, then control passes to a set of blocks associated with execution of the workflow. If the release is not approved, then the method ends and the release process is discontinued. Alternatively, control may pass to a state in which a user is given an opportunity to take a corrective action (e.g., an update or modification to address a comment from an approver).

The workflow is executed in an act 216 in which a series of instructions are sent to the software engineering systems in the release pipeline. The release pipeline is implemented in accordance with the workflow action parameter data. The execution of the workflow may include or involve data generation for monitoring, compliance, or other purposes. At various points in the workflow, further execution of the workflow (e.g., a next step in the pipeline) may involve obtaining an approval from an authorized user. In the embodiment of FIG. 3, a callback 217 to the act 212 may be implemented to send another notification to an approver. Further execution of the workflow may then continue if the decision block 214 determines that the approval is received.

In this example, data indicative of such approvals, workflow metrics, and/or other data indicative of actions implemented during workflow execution are recorded in an act 218. For example, such data may be recorded in one or more log files, which may be stored in one of the above-referenced data stores and/or another data store. Such data may specify a user who approved a specific action (e.g., the initiation of the workflow), as described herein. The act 218 may also include the presentation of data indicative of the workflow execution via a dashboard generated by the front end system 120 (FIG. 1). The dashboard may display workflow metric data as described above. One or more metrics to be displayed via the dashboard during execution of the workflow may be specified via the workflow action parameter data provided in connection with the release request.

A policy schema may be accessed in an act 220 to obtain any gating or other rules for the workflow. The policy schema may include a configuration file, such as an XML file, as described above. Alternatively or additionally, data indicative of some or all of the policy schema (and/or gating rules) may be accessed via another mechanism, such as via a user interface generated by the release management system 102 (FIG. 1). For example, a gating rule may be provided via a user interface during the execution of the workflow. In some embodiments, the policy schema may be accessed to configure an instruction in the series of instructions provided to the software engineering systems, which may, for example, involve application of one or more gating rules.

During execution of the workflow, a successive instruction in the series of instructions is sent based on whether a transition criterion or other gating rule of the configuration file or other specification of the policy schema for the release is met. In this embodiment, an entry criterion or an exit criterion is applied in an act 222. Such transition criteria may specify, for example, quality assurance rules for entering or exiting a step in the workflow, as described above. Alternatively, one of the transition criteria may specify a production environment compliance rule for entering or exiting a step in the workflow, as also described above. In yet another example, one of the transition criteria may specify a user role to approve implementation of a successive instruction in the series of instructions, including, for instance, initiation of the workflow. The transition criteria may be applied via a policy engine. The policy engine may configure an instruction in the series of instructions based on the gating rule(s) of the policy schema.

The embodiment of FIG. 3 includes a number of acts that may be implemented during execution of the workflow. In some cases, the workflow action parameter data specifies that such acts be implemented. A system health parameter of a computer (e.g., a server computer) or computing system executing the workflow may be monitored in an act 224. A state of the production environment may be monitored or validated in an act 226 to ensure that a validation criterion (relating to, e.g., a dependency of the software product) is met before, for instance, a build is released to the production environment. In dependency validation examples, validating the state of the production environment may thus include determining a state of the dependency, and validating the state of the dependency before implementing the release. A release action or other event (e.g., a release to the production environment) may be scheduled in an act 228 for a later time based on the state of the production environment (or other state monitored during workflow execution). The scheduling may include specifying a constraint or condition to be met (relating to, e.g., a state of the dependency) before allowing the release or workflow action to be implemented.

A decision block 230 may determine whether an incident has occurred during workflow execution. A workflow incident may occur due to a failure to meet a transition criterion or other gating rule. For example, the decision block 230 may determine whether a system health parameter does not meet a threshold during the monitoring of the act 224, or whether a dependency of the software product does not meet a validation criterion during the validation of the act 226. Additional, fewer, or alternative types of incidents may be monitored. If an incident occurs, an alert is sent in an act 232 to a user authorized to respond. The authorization of the user to respond to the incident may be established or specified via the policy schema as described above (e.g., via a user role assignment). Another decision block 234 determines whether the workflow may be restarted, resumed (e.g., a workflow action may be retried), or skipped based on a response to the alert (e.g., from an authorized user). If a suitable response is received, control may return to the act 216 for further workflow execution. If not, then the execution of the release workflow may terminate. In some embodiments, the response to the alert may involve or include a gating rule change (e.g., within the above-referenced decision engine) or other change that renders the original criterion no longer applicable. In such cases, the workflow may resume automatically.

The release workflow may also be terminated via an override or other control provided by an administrator or other authorized user. For example, the decision block 230 may be configured to suspend the execution of the workflow as shown in FIG. 3.

If the decision block 230 is reached after successful implementation of the series of instructions in the workflow (e.g., without any incidents or any unaddressed incidents), then control may pass to an act 236 in which an alert or other message is sent indicating the successful completion of the release.

The order of the acts of the method may vary in addition to those variations identified above. For example, the policy schema may be accessed before the execution of the workflow and/or the processing of the workflow code. The workflow may thus be configured in accordance with the policy schema and the workflow action parameter data before execution. In such cases, one or more gating rules of the policy schema may alternatively or additionally be specified during execution, as described above.

Figure 4:
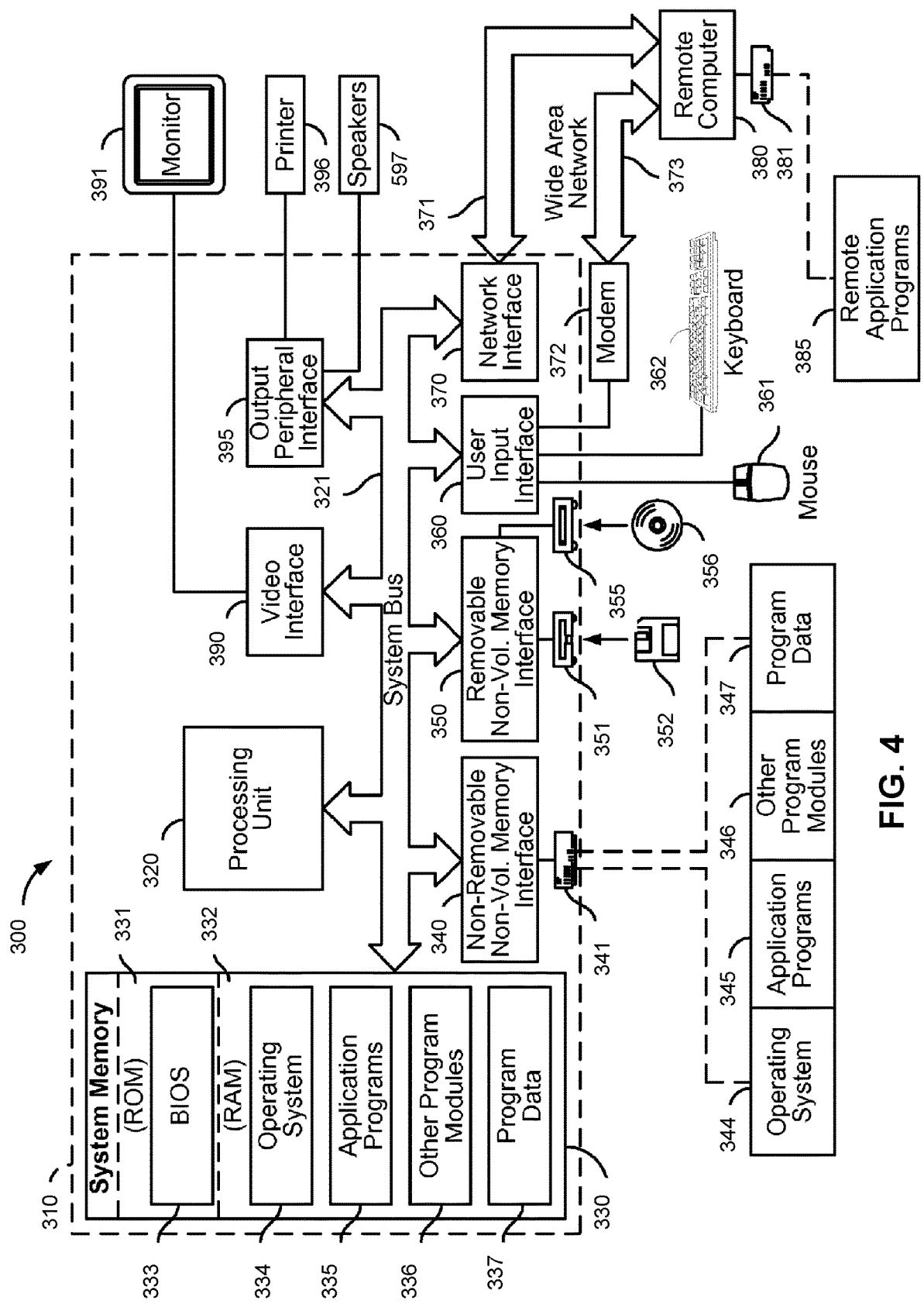
FIG. 4 is a block diagram of a computing environment in accordance with one embodiment for implementation of the disclosed methods and systems or one or more components or aspects thereof.

With reference to FIG. 4, an exemplary computing environment 300 may be used to implement one or more aspects or elements of the above-described methods and/or systems. The computing environment 300 may be used by, or incorporated into, one or more elements of the release management system 102 (FIG. 1). For example, the computing environment 300 may be used to implement the orchestrator 116, the workflow engine 122, the policy engine 118, and/or the front end system 120. The computing environment 300 may be used or included as a client, network server, application server, or database management system or other data store manager, of any of the aforementioned elements or system components. The computing environment 300 may be used to implement one or more of the acts described in connection with FIG. 3.

The computing environment 300 includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The units, components, and other hardware of computer 310 may vary from the example shown.

Computer 310 typically includes a variety of computer readable storage media configured to store instructions and other data. Such computer readable storage media may be any available media that may be accessed by computer 310 and includes both volatile and nonvolatile media, removable and non-removable media. Such computer readable storage media may include computer storage media as distinguished from communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 310.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 4 illustrates operating system 334, application programs 335, other program modules 336, and program data 337. For example, one or more of the application programs 335 may be directed to implementing one or more components of the orchestrator 116, the workflow engine 122, the policy engine 118, the front end system 120, and/or any instruction sets of the systems and methods described above. In this or another example, any one or more the instruction sets in the above-described memories or data storage devices may be stored as program data 337.

Any one or more of the operating system 334, the application programs 335, the other program modules 336, and the program data 337 may be stored on, and implemented via, a system on a chip (SOC). Any of the above-described modules may be implemented via one or more SOC devices. The extent to which the above-described modules are integrated in a SOC or other device may vary.

The computer 310 may also include other removable/non-removable, volatile/nonvolatile computer storage media. By way of example only, FIG. 4 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 4, provide storage of computer readable instructions, data structures, program modules and other data for the computer 310. For example, hard disk drive 341 is illustrated as storing operating system 344, application programs 345, other program modules 346, and program data 347. These components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone (e.g., for voice control), touchscreen (e.g., for touch-based gestures and other movements), ranger sensor or other camera (e.g., for gestures and other movements), joystick, game pad, satellite dish, and scanner. These and other input devices are often connected to the processing unit 320 through a user input interface 360 that is coupled to the system bus, but may be connected by other interface and bus structures, such as a parallel port, game port or a universal serial bus (USB). In some implementations of the computer 310, a monitor 391 or other type of display device is also connected to the system bus 321 via an interface, such as a video interface 390. In addition to the monitor, computers may also include other peripheral output devices such as printer 396 and speakers 397, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 4. The logical connections include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. FIG. 4 illustrates remote application programs 385 as residing on memory device 381. The network connections shown are exemplary and other means of establishing a communications link between the computers may be used.

The computing environment 300 of FIG. 4 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well-known computing systems, environments, and/or configurations that may be suitable for use with the technology herein include, but are not limited to, personal computers, server computers (including server-client architectures), hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A computer-implemented method for managing a release of a software product, the method comprising:

obtaining a request for the release, the request comprising workflow action parameter data that defines a release pipeline involving a plurality of software engineering systems, each software engineering system of the plurality of software engineering systems being configured to provide a respective software release service that processes data indicative of the software product, the workflow action parameter data specifying that the release pipeline includes at least a build step;

providing a front-end user interface that enables creation of the workflow action parameter data including creation of the build step via the front-end user interface, modification of the workflow action parameter data including modification of the build step via the front-end user interface, and specification of options associated with display of metric data via a dashboard including specification of options associated with the build step via the front-end user interface, wherein the metric data is associated with the release pipeline; and executing, with one or more processors, a workflow to implement the release pipeline in accordance with the workflow action parameter data;

wherein executing the workflow comprises providing release management services via a scalable plurality of instances of an orchestrator and scheduling an event for a time based on a state of the release monitored during workflow execution;

wherein providing the release management services comprises sending, by one or more of the instances of the orchestrator, a series of instructions to the plurality of software engineering systems, each instruction directing respective one of the plurality of software engineering systems to implement the respective software release service; and wherein a successive instruction in the series of instructions is sent based on whether a gating rule for the release is met.

2. The computer-implemented method of claim 1, further comprising accessing a configuration file that comprises data indicative of the gating rule, the configuration file being discrete from a data package in which the workflow action parameter data is stored, wherein the gating rule is applied in an automated manner.

3. The computer-implemented method of claim 1, further comprising receiving the gating rule via a user interface during execution of the workflow.

4. The computer-implemented method of claim 1, wherein the gating rule specifies a compliance parameter for approval of a respective step of the workflow.

5. The computer-implemented method of claim 1, wherein the gating rule specifies a quality assurance policy.

6. The computer-implemented method of claim 1, wherein the plurality of software engineering systems comprises a source control system configured to provide version control, a build system configured to compile source code data into binary code, and a validation system configured to validate operability of the binary code.

7. The computer-implemented method of claim 1, wherein each software engineering system of the plurality of software engineering systems comprises an interface configured to support data exchanges with one or more instances of the plurality of scalable instances of the orchestrator.

8. The computer-implemented method of claim 7, wherein the interface comprises an application programming interface (API).

9. The computer-implemented method of claim 1, wherein the workflow action parameter data specifies that the release pipeline includes a build step and a deployment step.

10. The computer-implemented method of claim 1, wherein obtaining the request comprises receiving the workflow action parameter data via an application programming interface (API) of a respective instance of the orchestrator.

11. The computer-implemented method of claim 1, wherein the gating rule specifies a validation criterion for validation of the software product before releasing a build of the software product to a production environment.

12. The computer-implemented method of claim 1, wherein the gating rule specifies a code coverage threshold.

13. The computer-implemented method of claim 1, wherein executing the workflow comprises interpreting workflow code by a workflow interpreter of a respective instance of the orchestrator.

14. Computer storage media for implementing a method of managing a release of a software product, the computer storage media having stored thereon computer-executable instructions that, when executed by one or more processors of a computing system, cause the computing system to perform the method, the method comprising:
 receiving a request for the release, the request comprising workflow action parameter data that defines a release pipeline involving a plurality of software engineering systems, each software engineering system of the plurality of software engineering systems being configured to provide a respective software release service that processes data indicative of the software product, the workflow action parameter data specifying that the release pipeline includes at least a build step;
 providing a front-end user interface that enables creation of the workflow action parameter data including creation of the build step via the front-end user interface, modification of the workflow action parameter data, and specification of options associated with display of metric data via a dashboard, wherein the metric data is associated with the release pipeline;
 executing a workflow to implement the release pipeline in accordance with the workflow action parameter data and a policy schema;
 wherein executing the workflow comprises providing release management services via a scalable plurality of instances of an orchestrator and scheduling an event for a time based on a state of the release monitored during workflow execution; and
 wherein providing the release management services comprises:
 sending, by one or more of the instances of the orchestrator, a series of instructions to the plurality of software engineering systems, each instruction directing a respective one of the plurality of software engineering systems to implement the respective software release service;
 accessing a configuration file that comprises data indicative of the policy schema; and
 applying a gating rule of the policy schema to determine whether a successive instruction in the series of instructions is sent.

15. The article of manufacture computer storage media of claim 14, wherein the gating rule specifies a validation criterion for validation of the software product.

16. A device for managing a release of a software product, the device comprising:
 at least one memory and at least one processor, wherein the at least one memory and the at least one processor are respectively configured to store and execute instructions for causing the device to perform operations, the operations comprising:
 obtaining a request for the release, the request comprising workflow action parameter data that defines a release pipeline involving a plurality of software engineering systems, each software engineering system of the plurality of software engineering systems being configured to provide a respective software release service that processes data indicative of the software product, the workflow action parameter data specifying that the release pipeline includes at least a build step;
 providing a front-end user interface that enables creation of the workflow action parameter data including creation of the build step via the front-end user interface, modification of the workflow action parameter data, and specification of options associated with display of metric data via a dashboard, wherein the metric data is associated with the release pipeline; and
 executing a workflow that implements the release pipeline in accordance with the workflow action parameter data, including:
 providing release management services via a scalable plurality of instances of an orchestrator, including:
 sending a series of instructions to the plurality of software engineering systems, each instruction directing a respective one of the plurality of software engineering systems to implement the respective software release service, wherein a successive instruction in the series of instructions is sent based on whether a gating rule for the release is met.

17. The device of claim 16, wherein the operations further comprise accessing a configuration file that comprises data indicative of the gating rule, the configuration file being discrete from a data package in which the workflow action parameter data is stored.

18. The device of claim 16, wherein the gating rule is received via a user interface during execution of the workflow.

19. The device of claim 16, wherein the workflow action parameter data is received via a user interface during execution of the workflow.

* * * * *